Patented Sept. 16, 1947

2,427,473

UNITED STATES PATENT OFFICE 2,427,473

PREPARATION OF PIPERAZINE

Harry Fred Pfann, Greenwich, Conn., assignor to American Cynamid Company, New York, N. Y., a corporation of Maine No Drawing. Application October 3, 1942, Serial No. 460,683

8 Claims. (Cl. 260—268)

This invention relates to the production of piperazines by the catalytic dehydration of hydroxy aliphatic amines. More particularly the invention relates to the intra-molecular dehydration of 2-hydroxyethyl ethylene diamine to piperazine by vapor phase catalysis.

Various six-membered cyclic nitrogen bases, previously known but little used, have in recent years become of increasing industrial importance. Piperazine, for example, is an excellent illustration. The physical properties of piperazine have been known for many years, yet commercially it has been of very little importance. Recently, however, the demand for piperazine has been steadily increasing. Piperazine is useful both in pharmaceuticals and as a starting material for the manufacture of pyrazine, which is in turn of importance as an intermediate in the preparation of dyestuffs and pharmaceuticals.

This demand, however, could not be readily satisfied since methods suitable for the large scale production of piperazine on a commercially feasible basis were lacking. The available supply was obtained by the use of relatively expensive and inefficient chemical procedures. One such method comprised the direct amination of an alkylene dihalide, such as ethylene dibromide. This procedure was difficult to control and gave poor yields. Most of the alkylene dihalide was converted to a mixture of alkylene polyamines such as ethylene diamine, diethylene triamine, triethylene tetramine and the like. In fact that process amounted to little more than recovering one of the minor by-products in the commercial production of these alkylene polyamides.

Perhaps the most commonly used process was to react an alkylene dihalide, such as the aforementioned ethylene dibromide, with an amine such as aniline. This resulted in the production of a small yield of N,N'-phenyl substituted piperazine which could be subsequently split by chemical reaction. Neither of these processes, however, give particularly good yields and both are difficult to control.

As a result of the demand being greater than the available supply due to these difficulties in the manufacturing procedures, the cost of piperazine remained relatively high. In some cases this precluded the use of piperazine because the high cost rendered, otherwise desirable, procedures economically unfeasible. Again, because the demand exceeded the available supply, the commercial development of many of its desirable uses was held back. Accordingly, there remained a definite demand for a process whereby piperazine can be prepared easily, cheaply and in good yields on a commercially feasible scale.

It is, therefore, an object of the present invention to provide a relatively simple, efficient process for the production of piperazine. It is also an object of the present invention to carry out this procedure using starting materials which are readily available in suitable quantities.

In general the objects of the present invention are accomplished by carrying out a vapor phase cyclization and dehydration of an hydroxy aliphatic amine. This is illustrated, for example, by the conversion of 2-hydroxyethyl ethylene diamine to piperazine according to the theoretical equation:

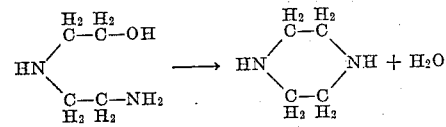

According to the present invention, this reaction is carried out by the use of a suitable catalyst. In general, therefore, the process of the present invention comprises vaporizing a hydroxyamine, passing the vaporized material over a suitable catalyst at an elevated temperature, condensing the reacted vapors and isolating the cyclic base from the condensate.

Hydroxy aliphatic polyamines are particularly advantageous as starting materials for the manufacture of cyclic nitrogen bases because of their commercial availability. A considerable amount of hydroxyamine, such for example as 2-hydroxyethyl ethylene diamine, is formed during the manufacture of such alkylene polyamines as ethylene diamine and diethylene triamine. Commercially, there has been substantially no use for these hydroxy amines per se. They are usually further aminated to convert them to additional quantities of alkylene polyamines, however at a cost considerably greater than that of the polyamine fractions produced in the first cycle. The present process, therefore, makes use of a by-product, readily available in suitable quantities and for which there has previously existed but little demand.

Several catalysts have been found suitable for use in the process of the present invention. Among the most satisfactory of these are "activated alumina," other aluminum oxides such as bauxite, silica, aluminum silicated such as kaolin and the like and oxides of thorium, titanium, zirconium and the like. "Activated alumina" as used in the present specification and claims refers to a commercial product produced by such processes as those illustrated, for example, in U. S. Patents 1,868,869 and 2,015,593. Not all of the materials suitable for use as catalysts are always readily available. However, of the catalysts which are readily available, activated alumina appears to give slightly better yields and therefore is perhaps preferable. The invention, however, is not necessarily so limited. Practically, mixtures of catalyst bodies may be used, good results being obtained, for example, by using a mixture of aluminum and titanium oxides. In other cases the catalytic zone may be divided into a plurality of zones, a different catalyst or mixture of catalysts being used in each.

It is an advantage of the present invention that its practice does not require the use of any particular apparatus. It is only necessary that there be a suitable means for feeding the raw material, a means for converting it to vapor form and a means for passing the vaporized material over the heated catalyst. The reacted vapors may be condensed and the product isolated by any desired means. Each of the elements of this apparatus may be varied almost at will so long as the intended function is accomplished.

The operating temperature at which the catalyst is maintained will vary somewhat in accordance with the particular circumstances. Good results were obtained, for example, using temperatures from about 350 to 550° C. with activated alumina as a catalyst. Above about 550° C. the yield is found to decrease due to the side reactions which begin to become appreciably more noticeable. Below about 350° C., the yield falls off quite appreciably. It has been found that one of the important factors in fixing the optimum reaction temperature is the time of contact. Preferably the temperature was maintained at between about 400–500° C., and the time of contact adjusted by changing the rate of feed or by varying the amount of a diluent gas used to sweep the vapors through the apparatus. It was found that conversions of from about 15 to 25% were obtainable in a single pass through the apparatus at the optimum temperature and that by recycling the unchanged material an overall efficiency of about 50–60% was obtained.

After condensing the vapors the desired product may be isolated in any one of several ways. For example, in the case of the production of piperazine from 2-hydroxyethyl ethylene diamine the condensate will contain some unreacted hydroxyamine, water, piperazine and condensed side reaction products. It will be noted from the theoretical equation given above that one mol of water should be formed for each mol of piperazine. If not otherwise removed, this water will form piperazine hydrates, principally the hexahydrate.

One procedure of isolating the piperazine is to dehydrate the condensate by using some agent such as dry potassium hydroxide and repeating the drying operation until the mixture is substantially free from water. The residue may be then separated by fractional distillation into cuts comprising principally unreacted hydroxyamine, piperazine and side reaction products. The piperazine fraction may be further fractionated to increase the purity if so desired.

On the other hand, if it appears to be undesirable to dehydrate the condensate by chemical means the mixture may be fractionated directly. The water present is allowed to form a hydrated piperazine which forms a mixture with water which boils at a lower temperature than anhydrous piperazine. This constant mixture may be collected as a separate fraction. If this procedure is followed it is preferable to supplement the water present by a sufficient amount to convert all the piperazine to its hydrated form.

While the discussion has been largely concerned with the production of piperazine from 2-hydroxyethyl ethylene diamine the invention is by no means so limited. Many other amines having a hydroxy group and an amino group separated therefrom by two carbon atoms may be treated. Monoethanol amine, for example, gives a good yield of piperazine. The most remote amino group, however, should be a primary amine having two replaceable hydrogens. Homologs of 2-hydroxyethyl ethylene diamine such as 2-hydroxy-propyl ethylene diamine, 2-amino-propyl ethanol amine, 2-hydroxy butyl propylene diamine and the like, also may be cyclized by intramolecular dehydration according to the present invention to produce substituted piperazines such as methyl or ethyl piperazine.

However, the presence of extensive side-chain substituents on the hydroxy amine tends to reduce the yield. The tendency both for the molecule to crack and for the reaction products to polymerize to tarry compounds is increased. The occurrence of polymerization in appreciable quantities is particularly undesirable since it directly decreases the usable life of the catalyst. It is an advantage of the present invention that by using the catalysts and temperature ranges of the present process, the tendency to produce polymerization products is minimized.

Where it is desirable to do so the catalyst may be readily reactivated. This can be done, for example, by heating the catalyst in a confined space while passing air through the mass to burn off the impurities. The actual temperature to which the material is heated will vary with the rate of air flow through the mass. Care should be taken, however, to maintain an air flow such that the temperature of the mass will be maintained below the point at which sintering will occur. With activated alumina, for example, it is preferable that the temperature be held below about 700° C.

As has been noted above, certain catalysts tend to increase the amounts of permanent gases leaving the apparatus over that which was fed. Part of this increase is due to the formation of ammonia in the side reactions. An appreciable portion of it, however, is due to the evolution of hydrogen by the dehydrogenation of some of the reaction products. Where piperazine is to be produced the dehydrogenation is undesirable and may be reduced to a minimum by replacing all or a part of the diluent gas with hydrogen.

This tendency toward dehydrogenation results in the formation of a certain amount of pyrazine. Where the piperazine is being prepared as an intermediate for the production of pyrazine, however, the tendency toward dehydrogenation exhibited by certain of the catalysts may be turned to advantage. Instead of minimizing the dehydrogenation it may be promoted to enable the production of pyrazine directly in a single stage process. This procedure, whereby pyrazine may be formed directly from the hydroxyamines comprises a part of the subject matter of my copending application, Serial No. 464,108, filed October 31, 1942.

The invention will be described in greater detail in conjunction with the following specific examples which are meant to be merely illustrative and do not in any way limit the invention. The parts are by weight unless otherwise noted.

*Example 1*

1200 gms. of 2-hydroxyethyl ethylene diamine was fed at the rate of about 3 gms./min. into a vaporizer maintained at about 375–400° C. The vaporized material was diluted with about 250 ml./min. of nitrogen gas and passed over about 250 ml. of a catalyst comprising 8 to 14 mesh activated alumina maintained at about 440–460° C.

The reaction products were then passed through a condenser and about 850 parts of condensate were collected. An appreciable amount of non-condensible gas was formed due to a side reaction. The distillate was worked up by drying the condensate with caustic potash and distilling the residue. The fraction boiling from 140-160° C. was collected as product and purified by refractionation to give piperazine, a white solid with a setting point of 105-108° C.

*Example 2*

The procedure of Example 1 was repeated using a catalyst temperature of 400-450° C. An increase in yield of final product over that of Example 1 indicated that the conversion was better in this temperature range.

*Example 3*

The procedure of Example 1 was repeated, passing the 2-hydroxyethyl ethylene diamine over 20 ml. of the same catalyst using an average catalyst temperature of about 520-560° C. and a feed rate of 2 gms./min. Somewhat smaller yield indicated that this temperature was higher than the optimum. An otherwise comparable product was obtained.

*Example 4*

The procedure of Example 1 was repeated, passing 106 gms. of 2-hydroxyethyl ethylene diamine over 80 ml. of the same catalyst during a period of 38 minutes. The nitrogen was replaced with hydrogen. This appeared to reduce the side reactions since the added volume of non-condensible gases generated during the reactions was smaller than in Example 1. Slightly better yield of a substantially identical product was obtained.

*Example 5*

The procedure of Example 1 was repeated using about 250 ml. of bauxite as a catalyst, replacing the activated alumina. A feed rate of 3 gms./min. and a catalyst temperature of 400-450° C. were maintained. A slightly smaller product fraction of comparable purity was obtained.

*Example 6*

The procedure of Example 1 was repeated using a mixed catalyst comprising activated alumina and titanium dioxide. A slightly smaller yield than that obtained in Example 2 but greater than that of Example 4 was obtained.

*Example 7*

The procedure of Example 1 was repeated using a double catalyst comprising 8 to 14 mesh Activated Alumina followed by copper chromite deposited on Activated Alumina. A marked increase in the volume of non-condensible gas indicated the presence of a different side reaction. Analysis of the combined low-boiling fractions showed a small amount of pyrazine to be present.

*Example 8*

The procedure of Example 7 was repeated replacing the nitrogen diluent with hydrogen. This appeared to be effective in substantially overcoming the side reaction of Example 7. The yield of purified product was also increased.

I claim:

1. A method of producing piperazines from aliphatic hydroxy amines which comprises vaporizing an aliphatic hydroxy amine selected from the group consisting of ethanol amine, 2-hydroxyethyl ethylene diamine and their C-alkyl substituted homologs, heating the vaporized material to a temperature of from about 350-400° C., passing the vapors over a dehydration catalyst at elevated temperatures of from about 350-550° C., whereby water is eliminated, condensing the condensible reaction products, collecting the condensate and isolating the piperazine therefrom.

2. A method according to claim 1 characterized in that the catalyst is maintained at temperatures from about 400-500° C.

3. A method according to claim 1 characterized in that the catalyst is selected from the group consisting of oxides of aluminum, silicon, thorium, titanium and zirconium and mixtures of the same.

4. A method of producing piperazines from aliphatic hydroxy amines which comprises vaporizing 2-hydroxyethyl ethylene diamine, heating the vaporized material at a temperature of from about 350-400° C., diluting the vapors with a heated gas, passing the diluted vapors over a dehydration catalyst maintained at elevated temperatures of from about 350-550° C. whereby reaction products including a piperazine, water and gases are formed, condensing the condensible reaction products, collecting the condensate and isolating the piperazine therefrom.

5. A method according to claim 4 characterized in that at least a part of the diluent gas is hydrogen.

6. A method according to claim 4 characterized in that the dehydration catalyst is selected from the group consisting of oxides of aluminum, silicon, thorium, titanium and zirconium and mixtures of the same.

7. A method according to claim 4 characterized in that the catalyst comprises an oxide of aluminum.

8. A method according to claim 4 characterized in that the catalyst comprises an oxide of titanium.

HARRY FRED PFANN.

REFERENCES CITED

The following references are of record in the file of this patent:

UNITED STATES PATENTS

| Number | Name | Date |
|---|---|---|
| 2,267,686 | Kyrides | Dec. 23, 1941 |
| 2,267,757 | Schuster et al. | Dec. 30, 1941 |
| 2,019,883 | Wulff et al. | Nov. 5, 1925 |

FOREIGN PATENTS

| Number | Country | Date |
|---|---|---|
| 657,979 | Germany | Mar. 18, 1938 |

OTHER REFERENCES

Journal Amer. Chem. Soc., vol. 56, pp. 153-4.
Catalysis in Organic Chemistry, Sabatier-Reid (1923 edition), pages 702 and 732.